United States Patent [19]
Frederick

[11] Patent Number: 5,990,868
[45] Date of Patent: Nov. 23, 1999

[54] METHOD AND APPARATUS FOR PERFORMING POWER CONSERVATION IN A POINTING DEVICE LOCATED ON A WIRELESS DATA ENTRY DEVICE

[75] Inventor: John W. Frederick, Spring, Tex.

[73] Assignee: Compaq Computer Corp., Houston, Tex.

[21] Appl. No.: 08/831,113

[22] Filed: Apr. 1, 1997

[51] Int. Cl.⁶ .................................................. G09G 5/08
[52] U.S. Cl. ....................... 345/158; 345/167; 345/163; 345/168
[58] Field of Search .................................. 345/163, 165, 345/167, 157, 158, 164, 166, 168; 395/750.01, 750.06, 750.04, 750.05; 348/589; 361/680; 341/176

[56] References Cited

U.S. PATENT DOCUMENTS

| | | | |
|---|---|---|---|
| 5,167,024 | 11/1992 | Smith et al. | 395/750.04 |
| 5,247,285 | 9/1993 | Yokota et al. | 361/680 |
| 5,648,781 | 7/1997 | Choi | 341/176 |

Primary Examiner—Richard A. Hjerpe
Assistant Examiner—Francis Nguyen
Attorney, Agent, or Firm—Vinson & Elkins, L.L.P.

[57] ABSTRACT

A remote control input device for use with a computer system is disclosed. The remote control input device typically includes means for wirelessly connecting the remote control input device to the computer system, a trackball, coupled to the connecting means for manipulating a pointing icon displayed on the video monitor, and a power source that powers the remote control input device. The remote control input device further includes a power management means for managing the power of the power source by monitoring the status and activity of the trackball used on the remote control input device. The remote control input device typically includes a first set of keys that provide input to the computer system and a second set of keys that are assigned to the trackball that control the pointing icon manipulated by the trackball. Additionally, the remote control input device may be a keyboard type arrangement with a trackball attached and first and second wrist wings can be located adjacent on either side of the keys typically below the key set in order to provide adequate support of the wrists during operation.

15 Claims, 3 Drawing Sheets

METHOD AND APPARATUS FOR PERFORMING POWER CONSERVATION IN A POINTING DEVICE LOCATED ON A WIRELESS DATA ENTRY DEVICE

BACKGROUND

1. Field of the Invention

The present invention relates generally to power conservation methods and devices and, more particularly, to a wireless data entry device operating under battery power, thus requiring improved power conservation techniques. More specifically still, the present invention relates to a pointing device having a multi-level power conservation method and apparatus that is responsive to activity caused by the pointing device or by any other input key associated with the pointing device used in a personal computing environment.

2. Description of the Related Art

Personal computers ("PC's") have become a standard fixture in many of today's households. PC's also have the advantages of performing many tasks or functions that have been typically performed by other household appliances. For example, a PC typically includes a monitor and with a television tuner within the PC, the monitor can serve as a television. Furthermore, PC's typically include CD ROM players, which double as compact disk audio players. Since PC's marry several of the same functions and features typically found in other common electronic appliances, such as televisions and audio equipment, a convergence of the PC with the television set or the audio equipment moves the PC out of the home study and into the living room. Just as televisions and audio equipment now include remote control devices, typically wireless remote control devices, for operating the appliance, PC's now use wireless keyboards and remotes with pointing devices for operation and user input.

With these keyboards and pointing devices, consumers will come to expect the same ease of use and carefree operation as the electronic remotes typically associated with their current video and audio equipment.

Unfortunately, pointing devices within personal computers that are battery operated typically have a higher power consumption relative to the standard remote control used in today's television systems. This is because of their proactive nature to monitor constantly for use input in a variety of ways. Solutions to this problem have occurred in the past, but are lacking in that they generate other problems that also must be overcome.

It is well-known that power conservation is significant when working with wireless devices since they rely on batteries for power source. If the pointing device, typically a trackball, remains active at all times, the battery life typically expends within a few days. Most consumers would find this unacceptable, as they do not wish to replace batteries every couple of days. Most consumers would be willing to use a device that was able to prolong the battery life for several months and, preferably, at least a year.

One type of method of providing power conservation is to use a mechanical switch to turn the pointing device on and off. One disadvantage of using a switch to activate the pointing device is that it is inconvenient for the operator to remember to turn the device on or turn the device off, especially when finished with the computer. Further, switching the remote on and off is something that is not required with a standard remote controller or keyboard. Thus, it is counterintuitive for a user to actively turn on a switch on a pointing device used with either a television or a computer system.

SUMMARY OF THE INVENTION

According to the present invention, a remote control input device is disclosed for use with a computer system. The remote control input device typically includes means for wirelessly connecting the remote control input device to the computer system, a trackball, coupled to the connecting means for manipulating a pointing icon displayed on the video monitor, and a power source that powers the remote control input device. The remote control input device further includes a power management means for managing the power of the power source by monitoring the status and activity of the trackball used on the remote control input device. The remote control input device typically includes a first set of keys that provide input to the computer system and a second set of keys that are assigned to the trackball that control the pointing icon manipulated by the trackball. Additionally, the remote control input device may be a keyboard type arrangement with a trackball attached and first and second wrist wings can be located adjacent on either side of the keys typically below the key set in order to provide adequate support of the wrists during operation.

The power management means further includes an active monitoring means that checks the trackball activity continually. The power management means further includes several sleep levels. The device selects the sleep level based on the amount of time the device has been idle. Typically, these preselected levels are three levels that are whether the trackball been left idle for more than twenty seconds, whether the trackball has been idle for more than ten minutes, or whether the trackball has been idle for more than thirty minutes. Based on the particular level of idleness, the system powers down the micro device for either activation every half second, every one second, or every two seconds, thereby preserving battery life in the remote control device.

This remote control input device may be used in not only a computer system, but also in a video monitoring system that includes a video monitor and a display output controller.

The power management device operates according to the method of determining whether the trackball pointing device is active, idle or asleep, then selecting a level based on the period of idleness of the trackball pointing device, and then reducing the power used by the remote controller by curtailing monitoring of the trackball pointing device according to the sleep level. The method automatically determines the activity of the trackball pointing device by sensing user input or by determining that a button has been pressed. If there is no activity of the trackball, or the button associated with the pointing device for a specified period of time, the system enters the Level 1 sleep mode, which means the trackball is checked once every half second for activity.

DETAILED DESCRIPTION OF THE DRAWINGS

Figure 1:
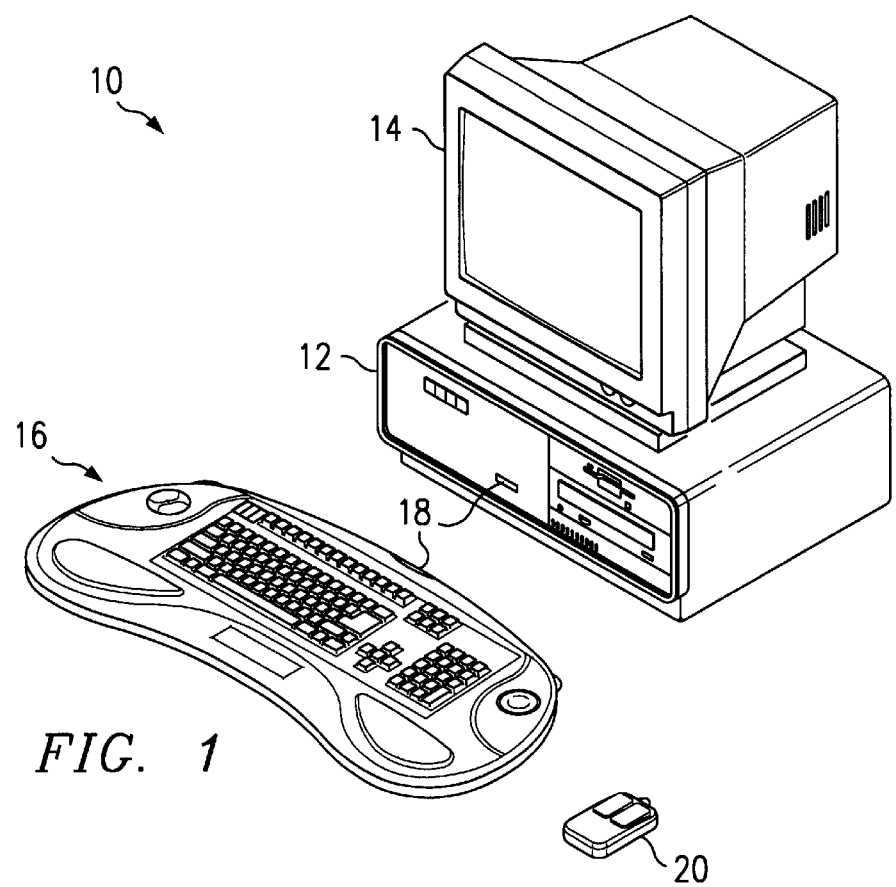
FIG. 1 is a block diagram of a computer system incorporating a power management system for use in a pointing device.

Referring now to FIG. 1, a diagram of a computer system 10 incorporating the present invention is shown. The computer system 10 is based on a computer 12 and includes a set of user interface devices to allow the user to provide data to and receive information from the computer system 10. In particular, the computer system 10 includes a display 14, which is the primary output interface component from the computer 12 to the user.

For user-to-computer interfacing, a keyboard 16 is coupled via an infrared (IR) transceiver unit 18 to the computer 12 to allow the user to enter data and direct the execution of the software. When keys on the keyboard 16 are struck, the keyboard 16 generates a set of signals that indicate which keys have been depressed. If a key has been depressed, the keyboard 16 of the computer 12 compatible with the IBM PC generates a unique "make" code corresponding to the depressed key, and conversely, when the key is released, the keyboard 16 sends a specific "break" code. Therefore, to enter a character or execute a function, the user operates the keyboard 16 to generate unique make and break signals that are received by the computer 12, which then enters the data or initiates the function according to the signal combination received.

As the user enters data into the computer 12, the data is shown on display 14. A wireless mouse 18 is then used to designate data for manipulation. It is the wireless mouse, along with its operation in various modes, such as, for example, standby, wait, and active, that allow the user to manipulate data with just the pointing device regardless of proximity to the computer, provided the signal can be received by computer 12. Further, keyboard 16 couples to the computer 12 via a wireless communication device, such as a transceiver that sends infrared (IR) signals between keyboard 16 and computer 12. Such IR transceivers are well-known in the art and would be well within the skill of the ordinary artisan with respect to implementing such a device.

Figure 2:
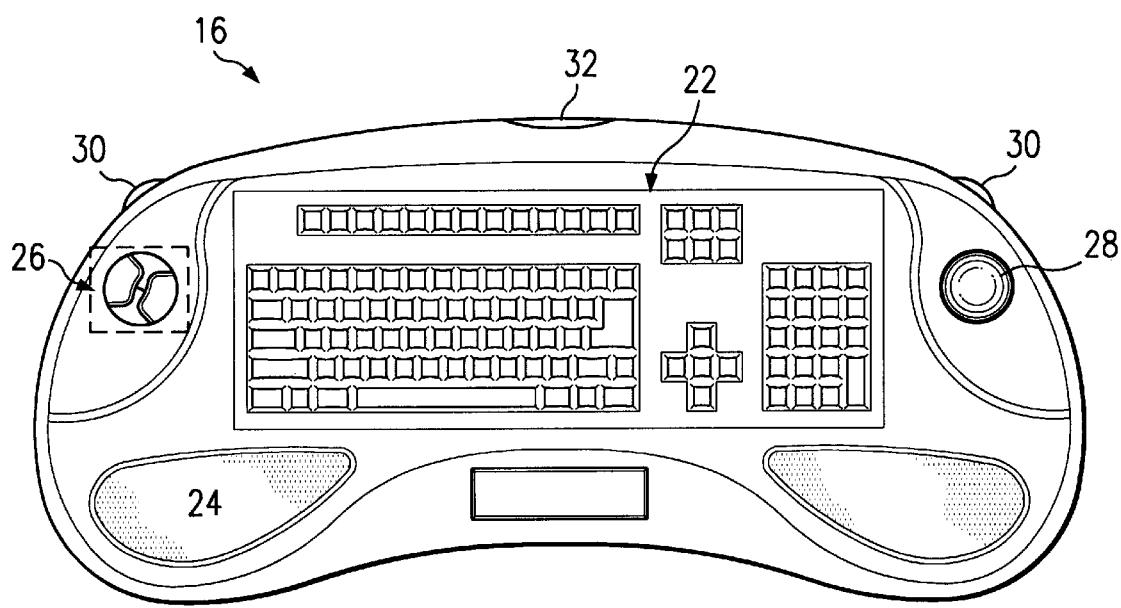
FIG. 2 is an illustration of a keyboard having a pointing device incorporating the power management system according to the invention of claim 1.
Figure 3:
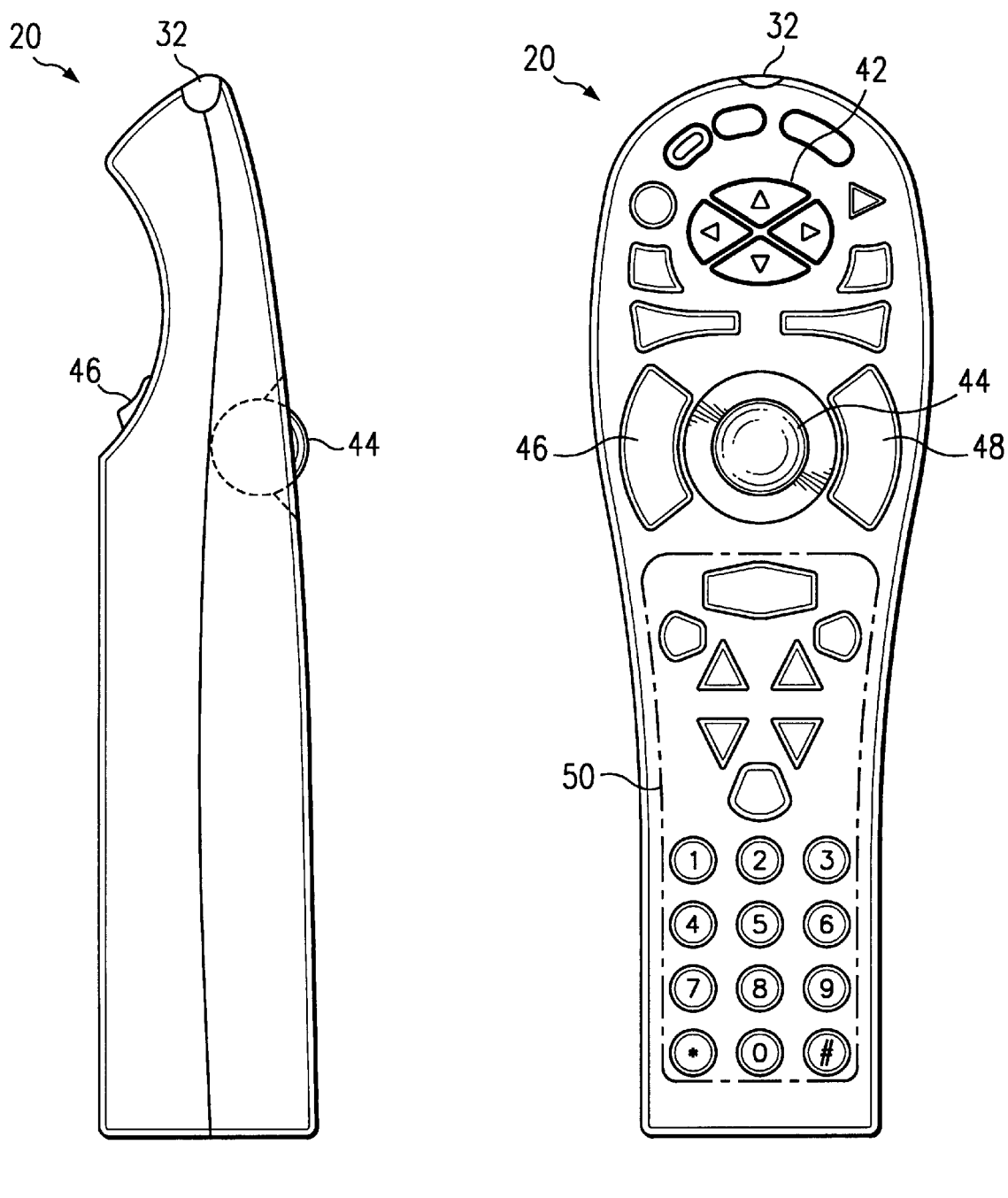
FIG. 3 illustrates a pointing device incorporating the power management system according to the present invention.

The keyboard 16 is shown in greater detail in FIG. 2, whereas the pointing device 20 is shown in greater detail in FIG. 3.

In FIG. 2, the keyboard 16 is shown in greater detail. The keyboard 16 further includes a keyboard layout that includes a full complement of keys 22 according to the AT-standard keyboard. The keyboard 16 is kidney-shaped to allow a user to rest the wireless keyboard on the user's lap in such a manner so that wings 24 of the keyboard 16 allow a user to place his or her wrists in a comfortable manner during operation. To the left and right of the main keyboard 32 are integrated mouse keys 26 and trackball 28, respectively. Additionally, user activation buttons 30 are provided at the tips of the wings slightly above both the mouse buttons 26 and trackball 28. An IR transceiver window 42 is placed at the front of the keyboard 16 to send and receive IR signals to and from computer 12. The keyboard 16 in FIG. 3 is merely one implementation of the wireless data input device contemplated for use with the computer 12. An alternative wireless communication device is remote control 20 further depicted in FIG. 3. The actual operation and implementation of the timing sequences is further depicted in the flow chart of FIG. 4.

The remote control 20 is further depicted in FIG. 3. The playing device or remote control 20 has a keypad layout substantially similar to typical remote controllers used in the multi-media arts. Namely, remote control 20 is substantially similar in design to the standard television remote control or video cassette recorder remote controller typically found in the industry today. Various modifications, however, have been adapted to remote controller 20 to allow it to operate a computer system, namely, computer 12 of FIG. 1. A numerical key pad is provided on the remote controller. Functions that are typically associated with a computer are also added. These include a four-directional keypad 42, a trackball device 44, and mouse keypads 46 and 48. Additionally, on the reverse side of a remote controller 20 is a second mouse button 46 which corresponds to the left mouse button 46 typically found on a pointing device. This bottom mouse button 46 provides for a trigger action that is useful in game playing or other type of controlling where a user's hand will fit snugly around the remote controller 20, such as the index finger may comfortably rest on the button for activation.

The remote control 20 is capable of automatically recovering from all possible error conditions typically encountered in operation. When such an error occurs, the remote shall not stop responding to the user input. Further, no hard reset is required, such as removing and replacing the batteries, to provide recovery for the remote during an error condition. Instead, all possible user inputs will be acted upon when those inputs are valid or ignored when those inputs are invalid, thus avoiding any error conditions that could cause the device to stop responding. Additionally, when the trackball 44 is active, the remote control 20 shall send IR mouse data packets at a minimum rate of 40 packets per second.

Further, the remote control 20 is programmed such that the pressing of any of the mouse buttons 46, 48 immediately wakes up the trackball monitoring system should the trackball be in a power conservation mode. When the trackball 44 is in a power conservation or sleep mode, and a mouse button 46, 48 is pressed, the input passes to the system. Pressing any of the remote keys 50 does not necessarily activate the trackball 44. If a keyboard key is pressed, the trackball 44 returns to the beginning of level one sleep mode, as will be outlined below in the flow chart of FIG. 1.

There is intended to be a multi-level sleep mode to be used with the trackball 44. These time periods may be left to the designer to implement. An example of a desired sleep mode may be implemented according to the following:

Level 1—After 20 seconds of idle time (no movement), the trackball enters the sleep mode and wakes up every half second to check for ball movement.

Level 2—After ten minutes of idle time, the trackball wakes up every second to check for ball movement.

Level 3—After 30 minutes of idle time, the trackball wakes up every two seconds and checks for ball movement.

This sleep mode is directed by the level of idleness encountered by the remote control 20 or wireless keyboard 16 during operation. For example, during a Level 1 sleep mode, the remote controller 20 or keyboard 16 would have been idle for at least 20 seconds. The Level 2 sleep mode would occur should the system be idle for more than ten minutes, and the Level 3 sleep mode would occur should the device be idle for more than 30 minutes. Of course, additional idle periods may be established or constricted based upon the preferences of the designer.

Figure 4:
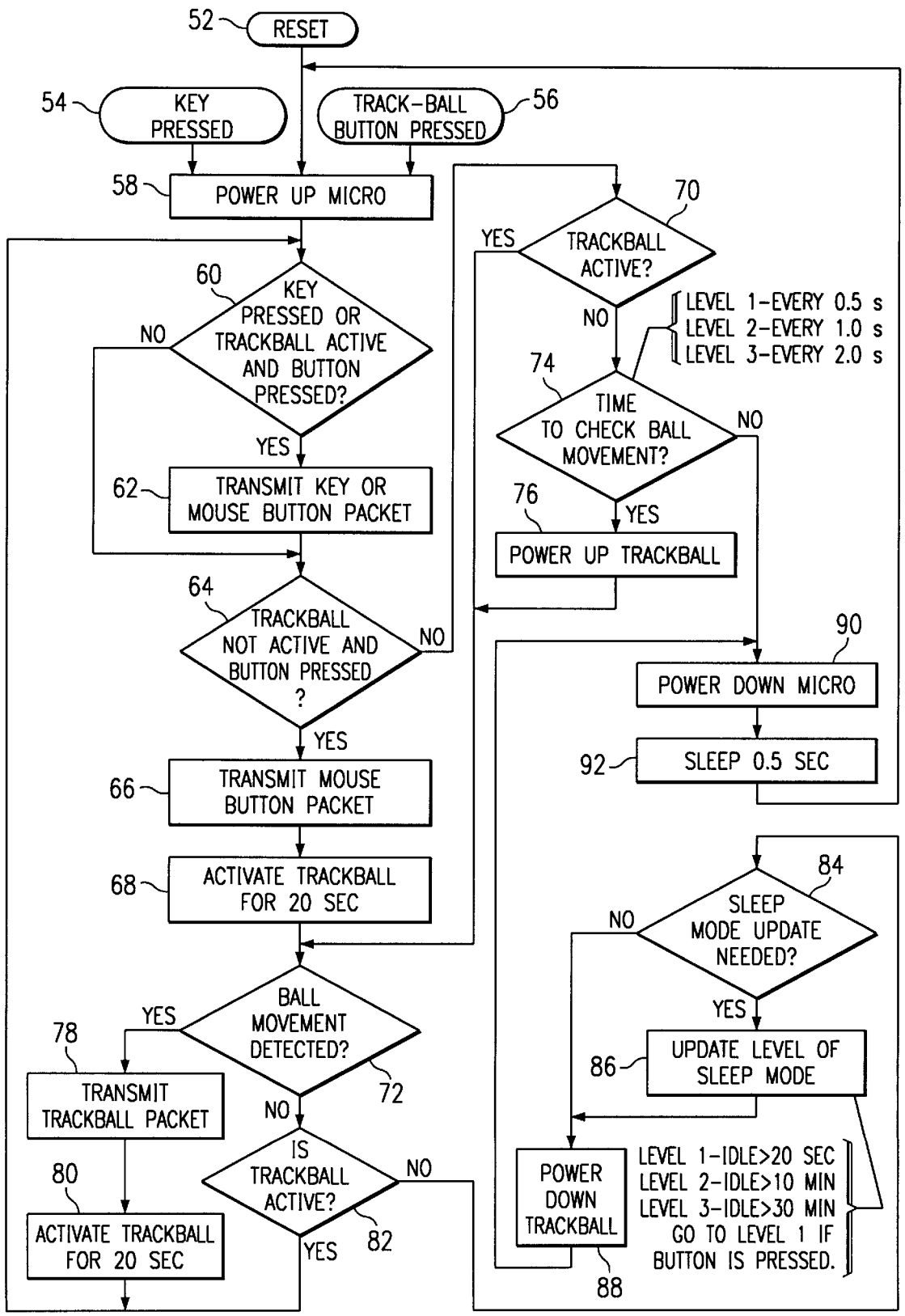
FIG. 4 illustrates in block diagram form the operation of the power management system according to the present invention.

FIG. 4 depicts a flow diagram of the power conservation method used by either the wireless keyboard 16 having a trackball 28 or the remote control 20 having a trackball 44. The power down modes are to conserve the energy of the batteries, thereby prolonging operating time in either wireless device. Rather than having an on/off switch, the device goes into a sleep mode that can be awakened upon a system reset 52, a key pressed 54, or a mouse button pressed 56. If any of these conditions are detected, the microcontroller of the device is awakened from its sleep mode in block 58. In addition, the microcontroller wakes up after 0.5 s of sleep 92 for processing.

Once the microcontroller is awakened, the device scans all of the keys to see if one has been pressed in block 60. If a key has been pressed, the key IR packet is transmitted in block 62 to the computer 12. The trackball is then returned to Level 1 sleep mode in block 63.

Next the device checks to see if a mouse button has been pressed in block 64. If a mouse button has been pressed, the system transmits a mouse button IR packet in block 66 to the computer 12. The trackball is then activated for 20 seconds in block 68, and processing continues in block 72 to check for trackball movement.

If a mouse button has not been pressed in block 64, the system then checks to see if the trackball is active in block 70. If the trackball is not in an active state, the system checks to see if it is time to check for ball movement in block 74.

When active, the trackball is checked for movement continuously, in Level 1 sleep mode the check is every 0.5 s, in Level 2 sleep mode the check is every 1.0 s, and in Level 3 sleep mode the check is every 2.0 s. If it is not time to check for trackball movement in block 74, the microcontroller enters the sleep mode in block 90. If it is time to check for ball movement, the trackball movement detection circuitry is powered up in block 76, and processing continues with the check for ball movement in block 72.

If the trackball is active in block 70, or the trackball was activated because of a mouse button press in block 68, or the trackball was activated in block 76 because the timer to check for ball movement expired, the old trackball position is compared against the current position to check for movement in block 72.

If movement is detected, the trackball movement IR packet is transmitted in block 78 to the computer 12, the trackball active timer is reset to 20 seconds in block 80, and processing continues with a scan of the keys in block 60. If trackball movement was not detected in block 72, processing continues with a check to see if the sleep mode needs to be updated in block 84. If the sleep mode does not need to be updated, processing continues with a scan of the keys in block 60. If no trackball movement has been detected for 20 seconds, the sleep mode is set to Level 1, if no movement for 10 minutes, the sleep mode is set to Level 2, and for no movement for 30 minutes, the sleep mode is set to Level 3.

If a sleep mode update is needed, the level of sleep is updated in block 86, the trackball is powered down in block 88, and the microcontroller is powered down in block 90. The microcontroller sleeps for 0.5 s in block 92, and wakes up to continue processing in block 58.

In block 72, if no trackball movement has been detected, then the system proceeds to block 82 to determine whether the trackball is active and, if so, proceeds to block 60 to repeat the monitoring of which type of system activity has been implemented. If there is no trackball activity, then the system proceeds to block 84 where the system then determines whether the sleep mode needs to be updated. If the sleep mode needs to be updated, then the system proceeds to block 86 where the sleep mode is updated according from one level to the next.

For purposes of illustration, this sleep mode level may be indicated where an idle time occurs after 20 seconds of activity at the Level 1 sleep mode. At Level 2, the system will go idle after ten minutes of inactivity, and at the third level, the system will go idle after 30 minutes of no activity. If a button is pushed or pressed, the system automatically goes to Level 1 for activity, thus signifying that the device is being used by a user. Once the sleep mode level has been updated, the system proceeds to block 88.

In block 88, and if the sleep mode level does not need to be updated from block 84, the system then powers down the trackball before proceeding to block 90 where the system then powers down the microprocessor within the device. Likewise, in block 74, if it is not time to check for any ball movement, then the system will power down in block 90. Once the microprocessor has been powered down, the system proceeds to block 92 where the system functions in a sleep mode where every half second the system determines whether any activity is occurring by powering up the microprocessor and repeating the steps 60–92 as previously described.

The present implementation of providing sleep modes for trackball power conservation for remotes and keyboards is significant in that it overcomes the disadvantages that exist in prior art methods. Specifically, there is no on/off switch necessary to be activated that typically a user would forget to switch between computer use time. Further, and more importantly, by merely activating the device via use, the user is able to begin operation immediately. Further, in adding multiple levels of sleep mode, the system is able to further reduce power consumption during long periods of sleep. There are several ways in which motion detection can be achieved within either the keyboard trackball or the remote control trackball. One method would be to use a small switch on the back or a simple gyroscope could also be used to return the trackball to the Level 1 sleep mode.

This achieves the goal of obtaining power conservation, thus preserving battery life by providing various levels of sleep mode operation that greatly reduce power consumption. Furthermore, this sleep mode operation is transparent to the user, as previously stated.

The above disclosure and description are illustrative and explanatory thereof, and various changes in size, shape, materials, components, circuit elements, wiring connections and contact, as well as timing parameters, as well as the details of the illustrated components and construction, may be made without departing from the spirit of the invention.

What is claimed:

1. A remote control input device for use with a computer system, the computer system having a video monitor, a processing unit, coupled to said video monitor, and a first wireless transmitter/receiver unit, said remote control input device comprising:

a second wireless transmitter/receiver unit connected to the remote control input device, wherein the first wireless transmitter/receiver unit and the second wireless transmitter/receiver unit communicate data;

a power source that powers said remote control input device; and a power management device;

the remote control input device including a cursor pointing device and a first plurality of keys coupled to a keyboard, wherein the power management device sets the cursor pointing device into an active mode, or into one of a plurality of sleep modes, the cursor pointing device being monitored for activity at different intervals in each of the sleep modes, and wherein the power management device sets the cursor pointing device from an initial sleep mode into a subsequent sleep mode upon activation of one of the first plurality of keys, the cursor pointing device being monitored for activity more often in subsequent the sleep mode than in the initial sleep mode.

2. The remote control input device according to claim 1 further comprising:

a second plurality of keys, coupled to a trackball, that control a pointing icon.

3. The remote control input device according to claim 1 further comprising:

first and second wrist wings, located adjacent, on either side and below the first plurality of keys, constituting a keyboard.

4. The remote control input device according to claim 3 wherein said power management device schedules monitoring according to a level of input.

5. The remote control input device according to claim 3 wherein a sleep mode selector unit selects an activity level based on the level of idleness of said remote control input device.

6. A video system comprising:

a video monitor;

a display output controller, coupled to said video monitor;

a remote controller, further comprising:

a keyboard having a fist plurality of keys;

a trackball, coupled to a wireless transceiver, for manipulating a pointing icon displayed on said video monitor, wherein the wireless transceiver exchanges information between said video system and said trackball; and a power management unit that sets the trackball into an active mode or one of a plurality of sleep modes, the power management unit setting the trackball from an initial sleep mode into a subsequent sleep mode when one of the first plurality of keys on the keyboard is activated, wherein the power management unit checks the trackball for input more often in the subsequent sleep mode than in the initial sleep mode.

7. The video system according to claim 6 wherein said remote controller further comprises:

a second plurality of keys, coupled to said trackball, that control said pointing icon.

8. The video system according to claim 6 wherein said remote controller further comprises:

first and second wrist wings, located adjacent, on either side and below a first plurality of keys.

9. The video system according to claim 6 wherein said power management unit schedules monitoring according to a level of trackball activity.

10. The video system according to claim 6 wherein a sleep mode selector selects an activity level based on the level of idleness of said trackball.

11. A method of managing power usage in a remote controller having a trackball pointing device and a keyboard comprising the steps of:

setting the trackball pointing device into an initial sleep mode, where the initial sleep mode is chosen from a plurality of sleep modes;

subsequently, detecting that a key on the keyboard has been activated; and setting the trackball pointing device into a subsegment sleep mode, where the trackball pointing device is monitored for activity more often in the subsequent sleep mode than in the initial sleep mode.

12. The method of managing power of claim 11 wherein sad step of setting the trackball pointing device into an initial sleep mode reduces power by idling a microprocessor scheduled to monitor the activity of said trackball pointing device and process the activity of said trackball pointing device.

13. The method of managing power of claim 11 further comprising setting the trackball pointing device into an active mode upon detecting activation of the trackball pointing device.

14. The method of managing power of claim 13 wherein said setting the trackball pointing device into an initial sleep mode step further comprises the step of selecting a second level of monitoring of said trackball pointing device according to a predetermined level of idleness of said remote controller.

15. The method of managing power of claim 14 further comprising selecting a third sleep mode for said trackball pointing device according to a second predetermined level of idleness of said remote controller exceeding said predetermined level of idleness.

* * * * *